(12) United States Patent
Jang

(10) Patent No.: US 8,736,123 B2
(45) Date of Patent: May 27, 2014

(54) SPINDLE MOTOR HAVING COUPLING STRUCTURE OF MAGNET AND HUB

(75) Inventor: Ho Kyung Jang, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 0 days.

(21) Appl. No.: 13/184,383

(22) Filed: Jul. 15, 2011

(65) Prior Publication Data

US 2012/0038235 A1 Feb. 16, 2012

(30) Foreign Application Priority Data

Aug. 12, 2010 (KR) .................. 10-2010-0077909

(51) Int. Cl.
*H02K 7/08* (2006.01)
*H02K 7/00* (2006.01)
*H02K 21/12* (2006.01)
*F16C 32/06* (2006.01)

(52) U.S. Cl.
USPC ........ 310/90; 310/67 R; 310/156.12; 384/100

(58) Field of Classification Search
CPC .................................. H02K 7/12; F16C 32/06
USPC ........ 310/156.12, 156.26, 90, 67 R; 384/100, 384/105, 107, 112, 121
See application file for complete search history.

(56) References Cited

U.S. PATENT DOCUMENTS

| | | | | |
|---|---|---|---|---|
| 5,880,545 | A * | 3/1999 | Takemura et al. | 310/90 |
| 6,445,096 | B1 * | 9/2002 | Saito et al. | 310/67 R |
| 7,893,584 | B2 | 2/2011 | Oh et al. | |
| 8,410,650 | B2 | 4/2013 | Jang et al. | |
| 2005/0286166 | A1 * | 12/2005 | Ando et al. | 360/99.08 |
| 2008/0036302 | A1 * | 2/2008 | Kim et al. | 310/11 |
| 2009/0279816 | A1 * | 11/2009 | Gomyo et al. | 384/100 |
| 2010/0187927 | A1 * | 7/2010 | Oh et al. | 310/90 |

FOREIGN PATENT DOCUMENTS

CN 1715690 1/2006
JP 07336929 A * 12/1995

OTHER PUBLICATIONS

Office Action from counterpart Chinese Patent Application No. 201110151453.0, mailed May 30, 2013, 16 pages, English Summary included.

* cited by examiner

*Primary Examiner* — Tran Nguyen
*Assistant Examiner* — Jose Gonzalez Quinones
(74) *Attorney, Agent, or Firm* — Blakely Sokoloff Taylor & Zafman LLP

(57) ABSTRACT

Disclosed herein is a spindle motor including: a rotating part including a hub coupled to a rotating shaft and a magnet coupled to the hub; and a fixing part including a sleeve supporting the rotating shaft and an armature facing the magnet, wherein the magnet has a contact part formed on an upper end portion thereof in a direction of the rotating shaft, the contact part partially contacting a lower end portion of the hub.

4 Claims, 4 Drawing Sheets

SPINDLE MOTOR HAVING COUPLING STRUCTURE OF MAGNET AND HUB

CROSS REFERENCE TO RELATED APPLICATION

This application claims the benefit of Korean Patent Application No. 10-2010-0077909, filed on Aug. 12, 2010, entitled "Spindle Motor", which is hereby incorporated by reference in its entirety into this application.

BACKGROUND OF THE INVENTION

1. Technical Field

The present invention relates to a spindle motor.

2. Description of the Related Art

Generally, in a spindle motor used as a driving device of a recording disk such as a hard disk, or the like, lubricating fluid such as oil, or the like, stored in a gap between a rotating shaft and a sleeve during rotation of the motor and a hydrodynamic bearing using dynamic pressure generated by the lubricating fluid have been variously used.

In addition, as the spindle motor has been used for various portable products such as a net-book, a mobile communication terminal, a game machine, an MP3 player, or the like, it has been improved so as to be appropriate for miniaturization, long-term use, and the like. Particularly, as the spindle motor has been used in the mobile communication terminal, power consumption saving, excellent vibration and noise characteristics, and the like, have been required. However, assembling accuracy is reduced due to a coupling structure of a magnet and a hub, a torque coefficient is reduced due to loss of magnetic flux, and noise and vibration characteristics are deteriorated.

More specifically, FIG. 1 is a schematic cross-sectional view of the spindle motor according to the prior art. As shown in FIG. 1, a spindle motor 100 includes a rotating shaft 110, a hub 120, a sleeve 130, an armature 140, a magnet 150, and a bracket 160.

The sleeve 130 is fixed to the bracket 160, and rotatably supports the rotating shaft 110.

In addition, the hub 120 is coupled to the rotating shaft 110, and has the magnet 150 fixed to an inner circumferential surface thereof.

Further, the bracket 160 has the armature 140 fixed to an outer circumferential portion thereof by press-fitting, adhesion, or the like, and the sleeve 130 fixed to an inner circumferential portion thereof by press-fitting, adhesion, or the like.

However, in a coupling structure of the hub 120 and the magnet 150, an upper end portion of the magnet 150 does not contact a lower end portion of the hub 120 in a direction of the rotating shaft, such that a reference point does not exist during the assembling of the magnet, thereby making it difficult to maintain assembling accuracy.

In addition, as shown in FIG. 2, which is a schematic partial configuration view of the spindle motor according to a second preferred embodiment of the prior art, in a coupling structure of a hub 220 and a magnet 250, the entire upper end portion of the magnet 250 contacts a lower end portion of the hub 220 in a direction of a rotating shaft. Therefore, magnetic flux increases in a direction of the hub 220, such that it is lost, which causes the reduction in a torque coefficient, noise, vibration, or the like.

SUMMARY OF THE INVENTION

The present invention has been made in an effort to provide a spindle motor in which a magnet partially contacts a hub in a coupling structure of the magnet and the hub, such that the magnet and the hub may be easily assembled to each other while assembling accuracy is maintained, loss of magnetic flux is minimized, such that reduction in a torque coefficient may be prevented, flow of unnecessary magnetic flux is prevented, such that vibration and noise may be reduced, and a tapered part is formed at a contact protrusion of the hub, such that a thickness of the hub may be increased and deformation amount thereof may be minimized.

Further, the present invention has been made in an effort to provide a spindle motor in which a contact part at which the magnet partially contacts the hub is formed, an adhesive is applied to the contact part, and a sealing groove is formed in the hub so as to be adjacent to an adhesive part to prevent leakage of the adhesive, such that product characteristics may be improved.

According to a first preferred embodiment of the present invention, there is provided a spindle motor including: a rotating part including a hub coupled to a rotating shaft and a magnet coupled to the hub; and a fixing part including a sleeve supporting the rotating shaft and an armature facing the magnet, wherein the magnet has a contact part formed on an upper end portion thereof in a direction of the rotating shaft, the contact part partially contacting a lower end portion of the hub.

The hub may have a contact protrusion formed on the lower end portion thereof and extending toward the magnet, and the contact protrusion may contact the upper end portion of the magnet to thereby form the contact part.

The contact protrusion may be formed to have a V-shaped cross section inclined toward the upper end portion of the magnet.

The contact protrusion may be formed to have a cross section of which one surface is inclined toward the upper end portion of the magnet.

The hub and the magnet may have an adhesive part formed by applying an adhesive to the contact part therebetween.

The hub may have a sealing groove formed therein so as to be adjacent to an adhesive part, wherein the sealing groove prevents leakage of the adhesive.

The fixing part may include: the sleeve rotatably supporting the rotating shaft; a bracket having the sleeve fixed thereto; the armature fixed to an outer circumferential portion of the bracket; a thrust plate positioned on an upper end portion of the sleeve in the direction of the rotating shaft; and a sealing part positioned on an outer circumferential portion of the thrust plate.

DESCRIPTION OF THE PREFERRED EMBODIMENTS

Figure 1:
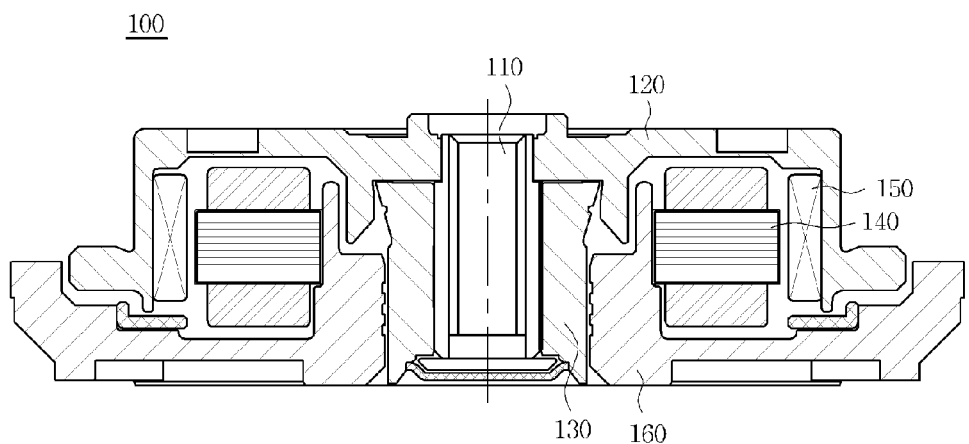
FIG. 1 is a schematic configuration view of the spindle motor according to a first preferred embodiment of the prior art.
Figure 2:
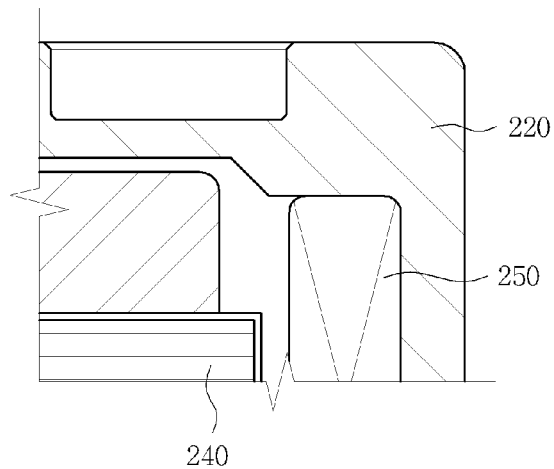
FIG. 2 is a schematic partial configuration view of the spindle motor according to a second preferred embodiment of the prior art.

Various features and advantages of the present invention will be more obvious from the following description with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In the description, the terms "first", "second", "one surface", "the other surface" and so on are used to distinguish one element from another element, and the elements are not defined by the above terms. In describing the present invention, a detailed description of related known functions or configurations will be omitted so as not to obscure the gist of the present invention.

Hereinafter, preferred embodiments of the present invention will be described in detail with reference to the accompanying drawings.

Figure 3:
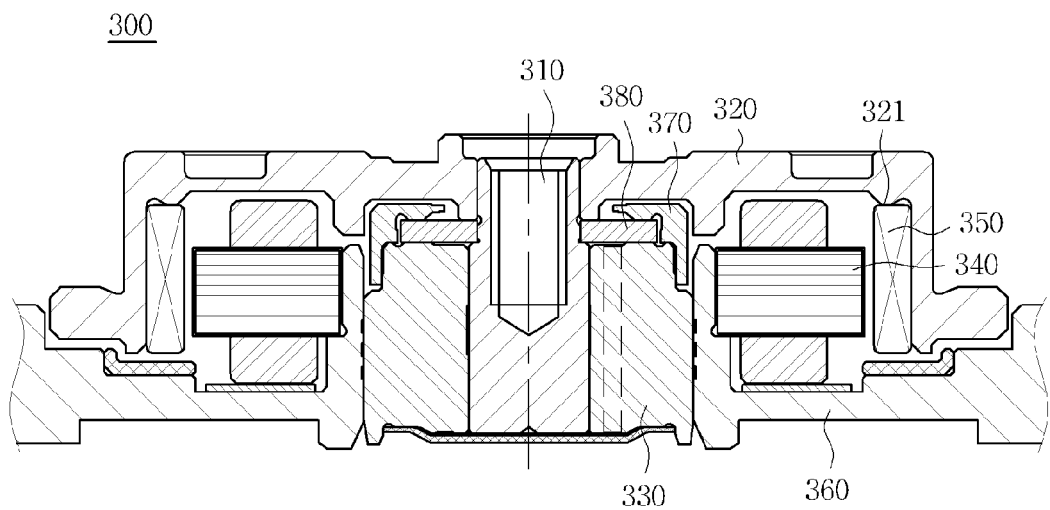
FIG. 3 is a schematic configuration view of a spindle motor according to a first preferred embodiment of the present invention.

FIG. 3 is a schematic configuration view of a spindle motor according to a first preferred embodiment of the present invention. As shown in FIG. 3, a spindle motor 300 includes a rotating shaft 310, a hub 320, a sleeve 330, an armature 340, a magnet 350, a bracket 360, a sealing member 370, and a thrust plate 380.

More specifically, in a fixing part, the sleeve 330 is fixed to the bracket 360, and rotatably supports the rotating shaft 310. Further, the bracket 360 has the armature 340 fixed to an outer circumferential portion thereof by press-fitting, adhesion, or the like, the armature 340 being configured of a core and a coil, and the bracket 360 has the sleeve 330 fixed to an inner circumferential portion thereof by press-fitting, adhesion, or the like.

In addition, the thrust plate 380 for generating dynamic pressure by oil is positioned to be spaced apart from an upper surface of the sleeve 330 by a predetermined interval in the rotating shaft. Further, the sealing member 370 is positioned on an outer circumferential portion of the thrust plate 380, and is to seal fluid forming a hydrodynamic bearing by oil and form an oil interface.

In a rotating part, the hub 320 is coupled to an upper end portion of the rotating shaft 310, and has the magnet 350 coupled and fixed to an inner circumferential surface thereof. In addition, the magnet 350 has a contact part formed on an upper end portion thereof in a direction of the rotating shaft, the contact part partially contacting a lower end portion of the hub 320.

Figure 4:
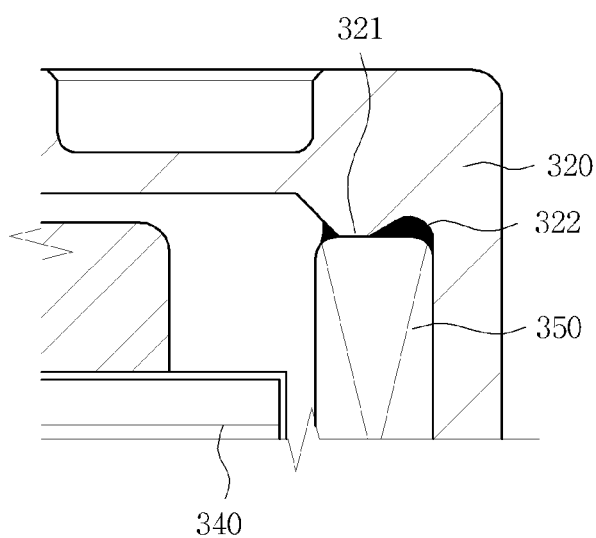
FIG. 4 is a partial detailed view of the spindle motor shown in FIG. 3.

More specifically, in a coupling structure of the magnet and the hub according to the present invention, the hub 320 has a contact protrusion 321 formed on the lower end portion thereof and extending toward the magnet 350, as shown in FIG. 4, and the contact protrusion 321 contacts the upper end portion of the magnet to thereby form the contact part.

In addition, the contact part is formed with an adhesive part 322 having an adhesive applied thereto. The magnet and the hub may be more firmly coupled to each other by the adhesive part 322. The contact protrusion 321 is formed to have a V-shaped cross section inclined toward the upper end portion of the magnet.

Figure 5:
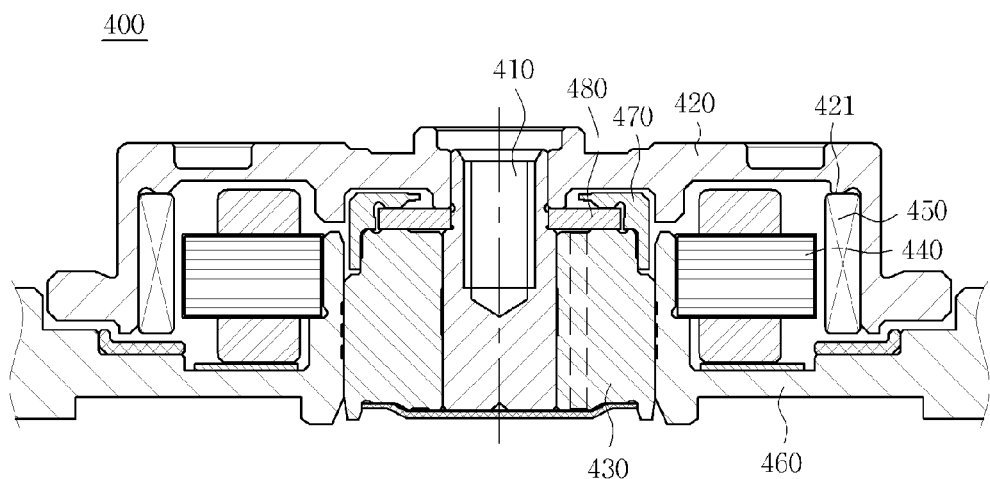
FIG. 5 is a schematic configuration view of a spindle motor according to a second preferred embodiment of the present invention.
Figure 6:
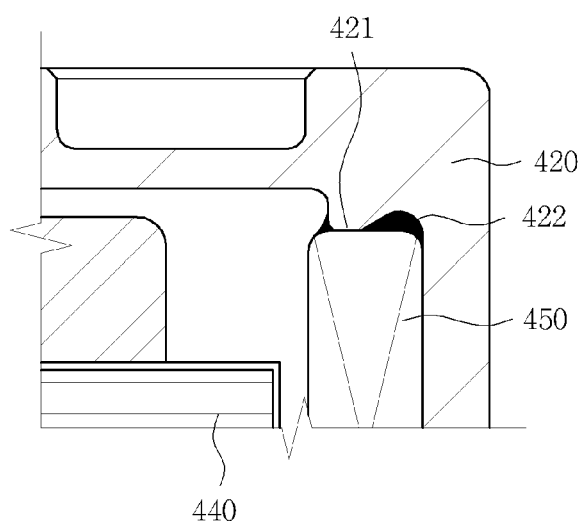
FIG. 6 is a partial detailed view of the spindle motor shown in FIG. 5.

FIG. 5 is a schematic configuration view of a spindle motor according to a second preferred embodiment of the present invention; and FIG. 6 is a partial detailed view of the spindle motor shown in FIG. 5. As shown in FIGS. 5 and 6, a spindle motor 400 includes a rotating shaft 410, a hub 420, a sleeve 430, an armature 440, a magnet 450, a bracket 460, a sealing member 470, and a thrust plate 480. The spindle motor 400 is different from the spindle motor 300 shown in FIG. 3 only in the coupling structure of the magnet and the hub. More specifically, only a portion of an upper end portion of the magnet 450 is coupled to a lower end portion of the hub 420, as shown in FIG. 6. To this end, the hub 420 has a contact protrusion 421 formed on the lower end portion thereof and extending toward the magnet 450, and the contact protrusion 421 contacts the upper end portion of the magnet to thereby form the contact part.

In addition, the contact part is formed with an adhesive part 422 having an adhesive applied thereto. The magnet and the hub may be more firmly coupled to each other by the adhesive part 422. The contact protrusion 421 is formed to have a cross section of which one surface is inclined toward the upper end portion of the magnet.

Figure 7:
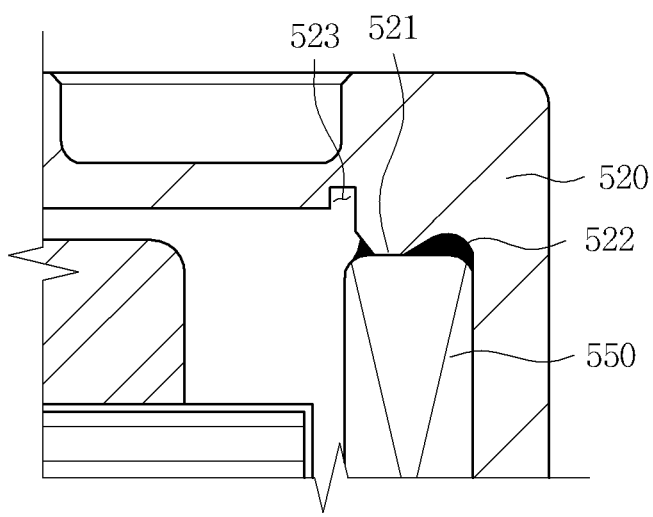
FIG. 7 is a schematic partial detailed view of a spindle motor according to a third preferred embodiment of the present invention.

FIG. 7 is a schematic partial detailed view of a spindle motor according to a third preferred embodiment of the present invention. As shown in FIG. 7, a spindle motor 500 is different from the spindle motor 300 shown in FIG. 3 only in a coupling structure of a magnet and a hub. More specifically, as shown in FIG. 7, only a portion of an upper end portion of the magnet 550 is coupled to a lower end portion of the hub 520. To this end, the hub 520 has a contact protrusion 521 formed on the lower end portion thereof and extending toward the magnet 550, and the contact protrusion 521 contacts the upper end portion of the magnet to thereby form the contact part.

In addition, the contact part is formed with an adhesive part 522 having an adhesive applied thereto. Further, a sealing groove 523 for preventing leakage of the adhesive is formed.

According to the present invention, the magnet partially contacts the hub in a coupling structure of the magnet and the hub, thereby making it possible to easily assemble the magnet and the hub to each other while maintaining assembling accuracy, loss of magnetic flux is minimized, thereby making it possible to prevent reduction in a torque coefficient, flow of unnecessary magnetic flux is prevented, thereby making it possible to reduce vibration and noise, and the tapered part is formed at the contact protrusion of the hub, thereby making it possible to increase a thickness of the hub and minimize deformation amount thereof. In addition, the contact part at which the magnet partially contacts the hub is formed, the adhesive is applied to the contact part, and the sealing groove is formed in the adhesive part so as to be adjacent to the contact part to prevent leakage of the adhesive, thereby making it possible to improve product characteristics.

Although the embodiment of the present invention has been disclosed for illustrative purposes, it will be appreciated that a spindle motor according to the invention is not limited thereby, and those skilled in the art will appreciate that various modifications, additions and substitutions are possible, without departing from the scope and spirit of the invention.

Accordingly, such modifications, additions and substitutions should also be understood to fall within the scope of the present invention.

What is claimed is:

1. A spindle motor, comprising:
a coupling structure composed of a magnet and a hub;
a rotating part including the hub coupled to a rotating shaft and the magnet coupled to the hub;
a fixing part including a sleeve supporting the rotating shaft and an armature facing the magnet,
wherein the magnet has a contact part formed on an upper end portion thereof in a direction of the rotating shaft, the contact part partially contacting a lower end portion of the hub,
wherein the hub has a contact protrusion formed on the lower end portion thereof and extending toward the magnet, and the contact protrusion contacts the upper end portion of the magnet to thereby form the contact part,
wherein the hub and the magnet have an adhesive part formed by applying an adhesive to the contact part there between, and
the hub has a sealing groove formed therein so as to be adjacent to an adhesive part, the sealing groove substantially preventing leakage of the adhesive and facing the armature,
and formed between the armature and the adhesive part.

2. The spindle motor as set forth in claim 1, wherein the contact protrusion is formed to have a V-shaped cross section inclined toward the upper end portion of the magnet.

3. The spindle motor as set forth in claim 1, wherein the contact protrusion is formed to have a cross section of which one surface is inclined toward the upper end portion of the magnet.

4. The spindle motor as set forth in claim 1, wherein the fixing part includes:
the sleeve rotatably supporting the rotating shaft;
a bracket having the sleeve fixed thereto;
the armature fixed to an outer circumferential portion of the bracket;
a thrust plate positioned on an upper end portion of the sleeve in the direction of the rotating shaft; and
a sealing part positioned on an outer circumferential portion of the thrust plate.

* * * * *